D. P. ZAPF.
CONTROLLING MEANS FOR AUTOMOBILES.
APPLICATION FILED APR. 12, 1910.
1,055,435.
Patented Mar. 11, 1913.
2 SHEETS—SHEET 1.
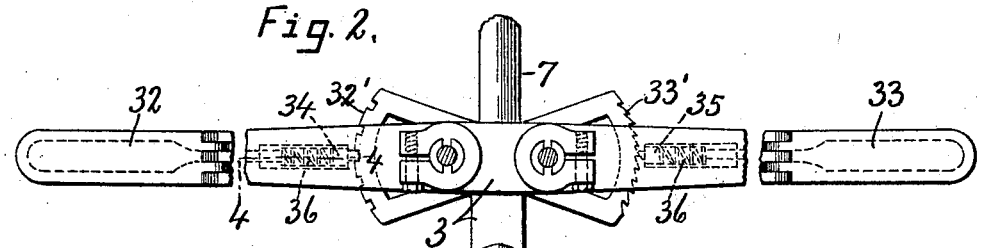
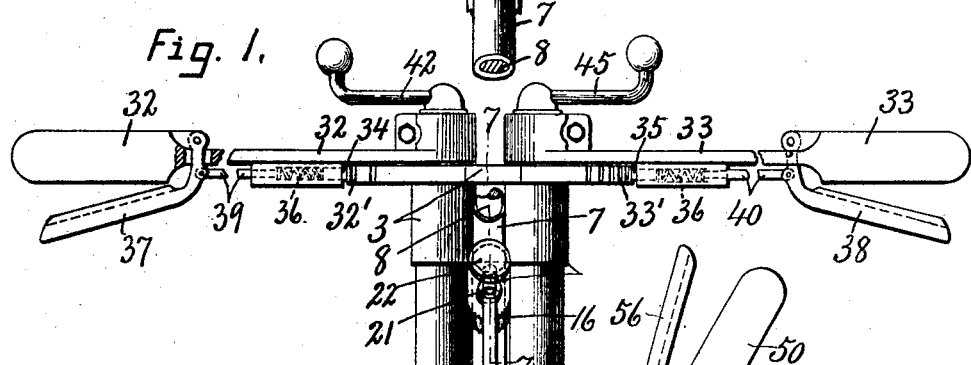
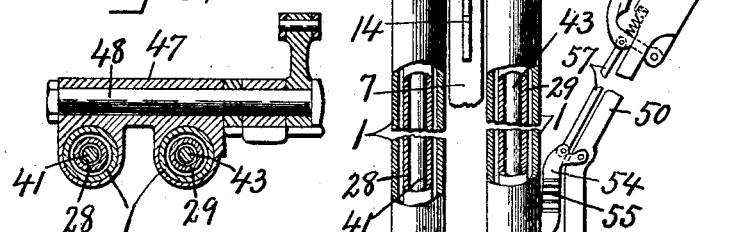
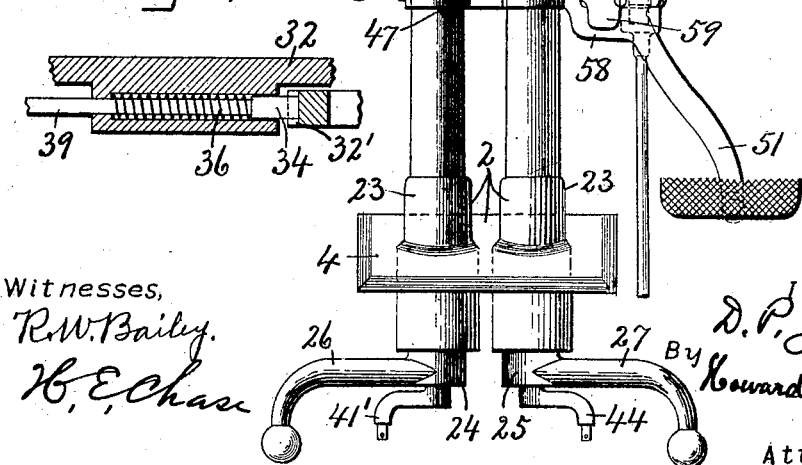

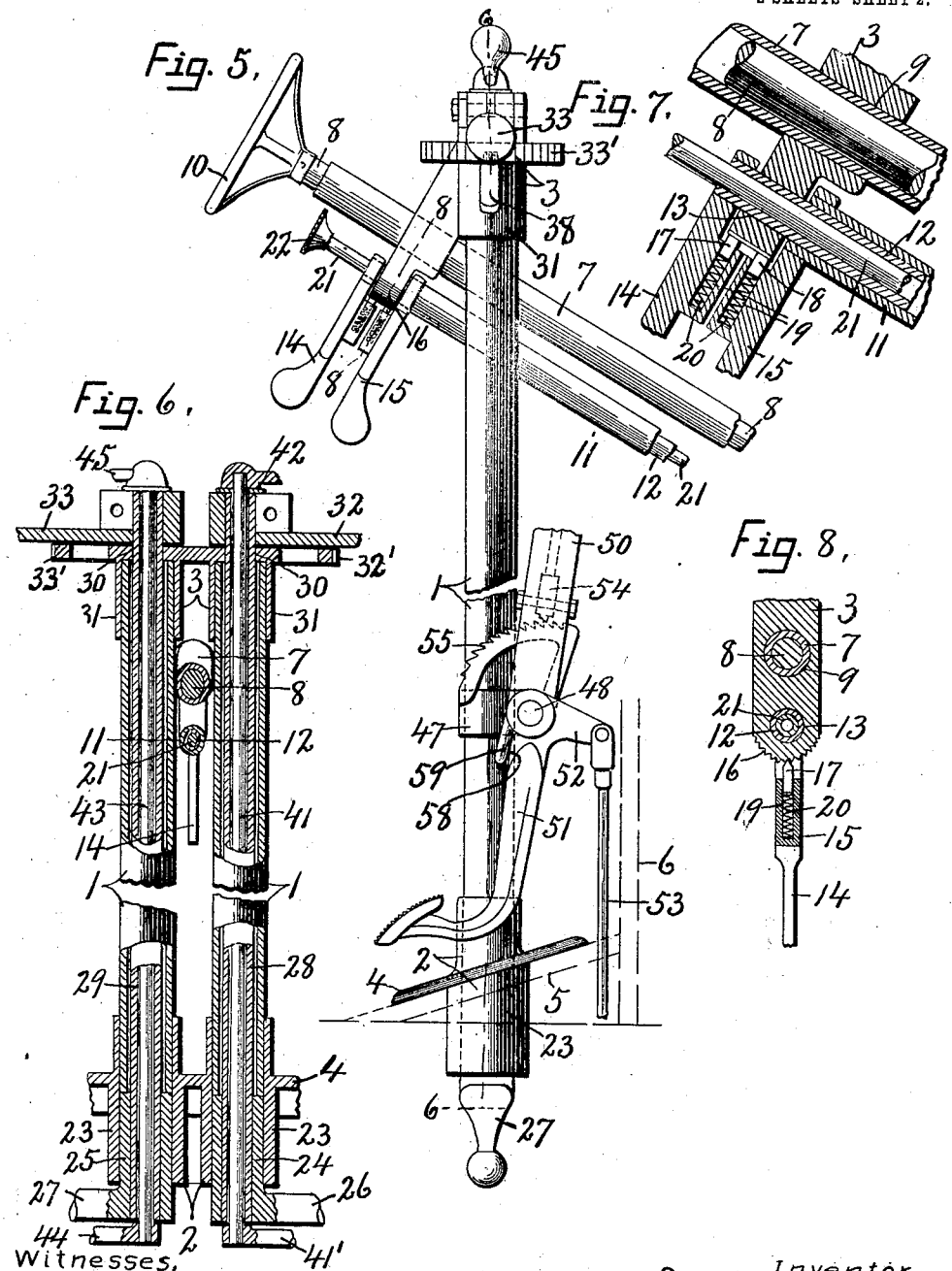

UNITED STATES PATENT OFFICE.

DANIEL P. ZAPF, OF CANASTOTA, NEW YORK.

CONTROLLING MEANS FOR AUTOMOBILES.

1,055,435.    Specification of Letters Patent.    Patented Mar. 11, 1913.

Application filed April 12, 1910. Serial No. 554,939.

*To all whom it may concern:*

Be it known that I, DANIEL P. ZAPF, of Canastota, in the county of Madison, in the State of New York, have invented new and useful Improvements in Controlling Means for Automobiles, of which the following, taken in connection with the accompanying drawings, is a full, clear, and exact description.

This invention relates to certain improvements in controlling means for automobiles and refers more particularly to the construction and relative association or arrangement of the controlling members for the steering-wheel, clutch, speed changing gears, emergency brake, muffler cut-out, carbureter, commutator and accelerator and signal or alarm.

The steering shaft and its supporting column or post in which it is revoluble are usually disposed in an upwardly and rearwardly inclined position, the supporting column being secured at its base to the body of the car leaving a considerable length of the post and steering shaft unsupported, so that there is always more or less vibration of the steering wheel during the operation of the machine. This vibration is transmitted to the hands and arms of the operator and produces a greater or less amount of numbness or partial paralysis which frequently causes the operator to lose control of the machine and often results in serious accident. It is also customary to have the controlling lever for the emergency brake at the outside of one end of the seat or chassis some distance from the steering wheel and to also locate other controlling devices on different parts of the machine more or less remote from the steering wheel, thereby making it necessary for the operator to temporarily lose control of the steering wheel while operating one of these remote controlling devices which also renders the operation of the machine more or less dangerous.

The main object is to bring all of these controlling elements together in compact space and in close proximity to the steering wheel where they are readily accessible from the normal steering position of the operator.

Another object is to provide a suitable support for the steering post and shaft near the steering wheel to prevent excessive vibration thereof.

A further object is to utilize these supporting stays for the reception of several of the controlling devices.

A still further object is to arrange the hand lever and foot lever for the emergency brakes coaxial upon the same journal or bearing and in such manner that a single connection to the brake serves for both levers.

Another object is to associate these brake levers in such manner that the pedal lever may be operated independently of the hand lever and that the operation of the hand lever will also operate the pedal lever.

Other objects and uses relating to the relative arrangement and construction of the controlling mechanism will be brought out in the following description.

In the drawings: Figure 1 is a rear elevation of the entire controlling mechanism, omitting the steering wheel. Fig. 2 is a top plan of the same. Figs. 3 and 4 are enlarged sectional views taken respectively on lines 3—3, Fig. 1, and 4—4, Fig. 2. Fig. 5 is a side elevation of the controlling mechanism seen in Fig. 1, showing the steering wheel, but omitting the upper portion of the emergency brake lever. Figs. 6, 7 and 8 are enlarged sectional views taken respectively on lines 6—6, Fig. 5; 7—7, Fig. 1 and 8—8, Fig. 5, the central portions of the tubular columns being broken away and partly in elevation in Fig. 6.

In carrying out the objects stated, a pair of tubular columns —1— are disposed in upright parallel planes in close proximity to each other and permanently connected at the top and bottom by suitable yokes —2— and —3—, the lower yoke —2— having an inclined foot —4— adapted to be secured in any suitable manner to the inclined foot rest —5— on the bottom of the car, said foot rest being shown by dotted lines in Fig. 5. These columns are comparatively small and arranged in close proximity to the front board or dash —6—, shown by dotted lines, so as not to interfere with the free movement of the operator when entering or leaving the car or when seated, said columns extending upwardly a sufficient distance to receive and support the rear end of an upwardly and rearwardly inclining steering post —7— in which is rotatable a steering shaft —8—.

The steering post —7— may be secured at its lower front end in any well known manner, not necessary to herein illustrate and describe, to the body or chassis of the machine in such position as to permit the lower front end of its steering shaft —8— to be connected in the usual manner to a steering gear, not shown.

The upper rear end of the tubular post is disposed in an inclined plane intersecting that of the tubular columns —1— between which it is located and is fitted closely within an aperture —9— in the yoke —3—, said yoke serving to rigidly connect the upper ends of the tubular columns and steering posts and hold them in fixed relation, the steering post extending upwardly and rearwardly a short distance beyond the yoke.

The steering shaft —8— extends through and some distance beyond its supporting post —7— where it is provided with a suitable steering wheel —10—, the latter being therefore located in proximity to the yoke —3— and upper end of the tubular columns —1—. The portions of the upright columns —1— between the yokes —2— and —3— are spaced a sufficient distance apart to receive between them the steering post —7— and an additional underlying tubular shaft —11—, the latter being also disposed in an inclined plane parallel with the steering post —7—. Closely fitting within and extending through the tubular shaft —11— is another tubular shaft —12— which is journaled at its upper rear end in a suitable bearing —13— in the yoke —3—, said inner tubular shaft extending a short distance through the yoke for receiving an operating lever —14— which is rigidly secured thereto. The tubular member —11— is journaled upon this inner tubular shaft —12— and terminates in close proximity to the lower front side of the yoke —3— where it is provided with an operating lever —15— also rigidly secured thereto.

The lower side of the yoke —3— is provided with a row of teeth or serrations —16— concentric with the axis of the tubular members —11— and —12— and adapted to be engaged by pawls —17— and —18— which are slidably mounted in sockets —19— in the levers —14— and —15— and are spring pressed to their holding positions by springs —20—, the latter being interposed between the inner ends of the pawls and outer ends of the sockets.

The inner tubular member —12— is adapted to be rotated independently of the outer tubular member —11— and together with its operating lever —14— constitutes the controlling means for a carbureter to which it is connected in any well known manner, not necessary to herein illustrate or describe. In like manner the tubular member —11— may be rotated independently of the inner tubular member —12— and together with its operating lever —15— constitutes the controlling means for a commutator, not shown, but which is adapted to be connected in any well known manner to the lower front end of the sleeve —11—. These two levers —14— and —15— are located one in advance of the other in the direction of length of the tubular member —11— and at opposite ends of the yoke —3— in close proximity to the steering wheel —10— from which position they may be readily manipulated to control the carbureter and commutator.

An accelerating valve rod —21— is extended through and rotatable or slidable within the inner tubular member —12— and is provided at its upper rear end with an operating knob or hand piece —22— by which it may be adjusted to control an accelerating valve, not necessary to herein illustrate or describe, it being understood that the lower rear end of this accelerating valve rod may be connected in any well known manner to any well known form of accelerating valve. The hand piece —22— for said valve rod is also in close proximity to the steering wheel —10— where it may be easily manipulated by the hand of the operator without changing positions.

The yoke —2— is provided with upwardly projecting parallel tubular sockets —23— in the upper ends of which are rigidly secured by brazing or otherwise the lower ends of the upright tubular columns —1—, the lower ends of said sockets receiving and supporting revoluble sleeves —24— and —25— having laterally projecting crank arms —26— and —27— adapted to be respectively connected to a speed changing gear and to the usual clutch in any well known manner, not necessary to herein illustrate and describe.

The sleeves —24— and —25— are secured by brazing or otherwise to the lower ends of separately revoluble upright tubes —28— and —29— located within and extending through their respective tubular columns —1— and having their upper ends journaled in and extending some distance upwardly beyond suitable bearings —30— in the yoke —3—. This upper yoke —3— is also provided with parallel tubular sockets —31— which are brazed or otherwise secured to the upper ends of the columns —1— for holding said ends in fixed relation to each other.

Secured to the upper ends of the tubular shafts —28— and —29— preferably keyed thereto for removal are suitable operating levers —32— and —33— carrying similar pawls —34— and —35— which are normally spring pressed into engagement with their respective racks —32'— and —33'— by springs —36—, as best seen in Fig. 4, said pawls being retracted against the action of their springs by levers —37— and —38— and links —39— and —40— by which the levers are connected to their respective pawls, the levers —37— and —38— being pivoted to their levers —32— and —33—.

The lever —32— and tubular shaft —28— together with the corresponding sleeve —24— and crank arm —26— constitute means for controlling a speed changing gear, the lever —32— being disposed in close proximity to and just in front of the steering wheel —10— and is movable horizontally around the rack —32'—, said lever being held in its adjusted position by the pawl —34—. In like manner the lever —33— and tubular shaft —29— together with the sleeve —25— and crank arm —27— constitute means for controlling a clutch, not shown, by which the engine-shaft is connected and disconnected to and from the running gear of the vehicle.

Within and extending through the tubular shaft —28— is a rock shaft —41— having its lower end provided with a crank arm —41'— adjusted below and in close proximity to the under arm —26— and adapted to be connected to a muffler cut-out of any well known construction, not shown. Secured to the upper end of this rock shaft is an operating lever —42— which together with the rock shaft —41— and crank arm —41'— constitutes the means for operating the muffler cut-out referred to. A similar rock shaft —43— is extended through and some distance beyond the opposite ends of the tubular shaft —29—, the lower end of said rock shaft being provided with a crank arm —44— adapted to be connected to a signal, alarm or whistle of any well known construction, not shown. The upper end of this rock shaft —43— is also provided with an operating member —45— which together with the rock shaft —43— and crank arm —44— constitute the means for controlling the operation of said signal, alarm or whistle.

It is apparent upon reference to the foregoing description and accompanying drawings that the controlling members for the carbureter, commutator and accelerator and also for the speed changing gear, clutch, muffler cut-out and whistle are all located in close proximity to and within easy reaching distance of the steering wheel —10— where they may be manipulated by the operator without changing his position.

A yoke —17— is secured to and connects the intermediate portions of the columns —1— and carries a shaft for journal-bearing —48— preferably at the front side of the columns. Upon this shaft is journaled an emergency brake hand lever —50— and a pedal or foot brake lever —51—, one of said levers, as —51—, being provided with a forwardly projecting crank arm —52— carrying a rod or link —53— which is adapted to be connected to any suitable form of brake, not necessary to herein illustrate or describe.

The hand lever —50— is provided with a pawl —54— which is normally spring pressed into engagement with a toothed rack —55—, the latter being secured to the yoke —47— concentric with the axis of the journal bearing —48— and together with said pawl serves to hold the brake lever in its adjusted position. This lever is provided with a pawl releasing lever —56— pivoted thereto and connected to the pawl by a link —57—, as best seen in Fig. 1.

The pedal lever —51— is provided with a bearing —58— some distance below the axis of the shaft —48— and adapted to be engaged by a pendent arm or shoulder —59— on the lower end of the hand lever —50—, so as to operate the pedal lever when the hand lever is operated and at the same time permits the pedal lever to be operated independently of the hand lever for operating the brake.

By arranging the steering post and columns in intersecting planes in the manner described and yoking them together near their ends, it is evident that the vibration of the steering wheel will be reduced to a minimum, and that by making the columns tubular the rock shafts for operating the main clutch, speed changing gears, muffler cut-out and whistle controlling valve may be passed therethrough or journaled therein without taking up any more room and at the same time bringing the several operating levers for such parts into close proximity with the steering wheel where they may be readily manipulated by the operator without his changing his position or distracting his attention from the path of movement of the vehicle. These columns and their yokes also serve as supporting mediums for the rock shafts for the steering gear, accelerator, carbureter and commutator as well as for the brake, so that practically all of the controlling devices necessary in the operation of a machine of this character are centralized or brought within a compact space within easy reaching distance from the steering wheel, the location of the hand lever for the brake mechanism being particularly advantageous due to the fact that it is directly under and in front of the steering wheel.

What I claim is:

1. A support for the controlling members of an automobile operating mechanism, comprising a pair of hollow vertically-disposed parallel supporting columns, a yoke connecting the upper ends of said columns, a yoke carried by the columns intermediate their ends, each of said yokes carrying and forming a support for controlling members, and a third yoke connecting the lower ends of said columns.

2. A support for the controlling members of an automobile operating mechanism, comprising a pair of hollow vertically-disposed parallel supporting posts receiving the steering post of the automobile between them at their upper ends, a yoke carried by the posts at their upper ends and constituting a support for the steering post, a yoke connecting the posts at their lower ends and a yoke carried by the posts intermediate their ends and constituting a support for controlling elements of the mechanism.

In witness whereof I have hereunto set my hand on this 8th day of April 1910.

DANIEL P. ZAPF.

Witnesses:
H. E. CHASE,
H. L. HUMPHREY.